No. 734,489. PATENTED JULY 21, 1903.
B. W. WITTENBERG, E. BROCK & E. KOCH.
VULCANIZING APPARATUS.
APPLICATION FILED MAY 15, 1902.
NO MODEL.
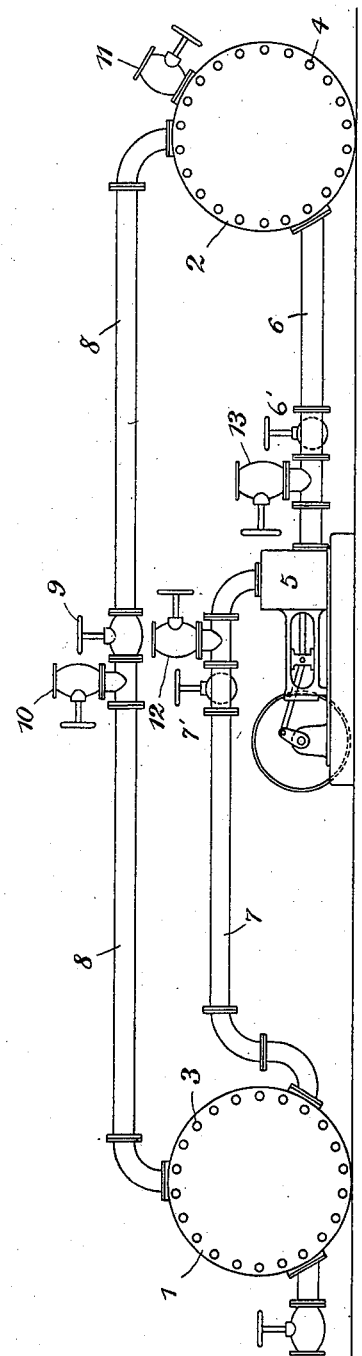

No. 734,489. Patented July 21, 1903.

UNITED STATES PATENT OFFICE.

BENJAMIN WLADIMIR WITTENBERG, ERWIN BROCK, AND ERWIN KOCH, OF RIGA, RUSSIA.

VULCANIZING APPARATUS.

SPECIFICATION forming part of Letters Patent No. 734,489, dated July 21, 1903.

Application filed May 15, 1902. Serial No. 107,440½. (No model.)

*To all whom it may concern:*

Be it known that we, BENJAMIN WLADIMIR WITTENBERG, merchant, ERWIN BROCK, engineer and chemist, and ERWIN KOCH, chemist, subjects of the Czar of Russia, residing at 31 Weidendamm, Riga, Russia, have invented certain new and useful Improvements in Vulcanizing Apparatus; and we do hereby declare the following to be a full, clear, and exact description of the invention, such as will enable others skilled in the art to which it appertains to make and use the same.

It is the object of the invention to provide an apparatus whereby the temperature and the pressure within the vulcanizing vessels may be varied independently of each other.

The invention consists in the features and combination and arrangement of parts hereinafter described, and particularly pointed out in the claims.

In the accompanying drawing the figure represents an apparatus in side elevation.

In the drawing, 1 and 2 represent two vulcanizing vessels of any suitable construction. They are provided, respectively, with tubes 3 4, which may be supplied with steam from any suitable source to heat the vessels to the desired temperature. The invention is not limited as to the manner of heating these vessels. Between the two vessels an air-pump 5 is located, connected by a pipe 6 with the vessel 2 and by a pipe 7 with the vessel 1. The pipe 6 connects with the suction side of the pump and the pipe 7 with the pressure or forcing side. Any suitable form of safety-valves may be employed with the vessels as well as thermometers and other suitable attachments. The two suitable vessels are connected by a pipe 8 extending directly between them, and a cut-off valve 9 is located in said pipe. At 10 on the pipe 8 a ventilating-valve is arranged, and a similar valve is arranged at 11 on the vessel 2. The valve 10 serves for the ventilation of the vessel 1, and both of these valves open to the atmosphere. Cut-off valves are employed in the pipes 6 and 7, and valves 12 and 13 are located on the pipes 7 and 6, respectively, communicating with the outside air. The temperature in the vessels 1 and 2 may be varied as desired, that in one vessel being entirely independent of that in the other vessel. The porosity of the product will depend upon the degree of heat and pressure employed in the vulcanization vessels, and by means of this apparatus both the heat and the pressure may be regulated to suit the results desired, the degree of heat and the degree of pressure being regulated independently in each vessel. Supposing the air-pump 5 to be in operation, it will create a suction from the vessel 2 and an increased pressure in the vessel 1, it being understood that the valve 9 in the conduit 8 is closed during this operation or nearly closed. This will create in the two chambers relatively different pressures, and the heat in each chamber may be increased or diminished to suit the results to be accomplished.

The invention is not limited to the combination illustrated of the two vulcanizing vessels, as only one vessel may be used, if desired. Supposing the vessel 1 to be used alone, it will be seen that any desired pressure may be secured therein by means of the air-pump, and the heating effect derived from the tubes 3 can be increased or diminished as needed. The vulcanizing-chamber may be ventilated by means of the valve 10 during the process, for which purpose the said valve 10 would be opened to an amount corresponding to the position of the valve 7', through which the pressure from the air-pump passes into the vulcanizing vessel. The same ventilating effect can be secured in connection with the chamber 2 by the regulation of the valve 11 in respect to the valve 6'.

In carrying out the method it is possible to use any desired gases or vapors under any desired pressure instead of steam or hot air.

Referring to the operation of the double form of apparatus illustrated, we will suppose, for example, that both vessels are heated to 100°. If now the air-pump is operated, it will force the uniformly-heated air or gas from one vessel into the other. Consequently in one vessel a low pressure exists in respect to the pressure in the other vessel, while the degree of heat in both vessels remains the same. By this double form of apparatus, which includes the direct pipe connection 8 between the vessels, it is possible to obtain a circulation of the air or gas throughout the vessels while maintaining the same degree of pressure, and it is also possible to ventilate both vessels during the operation without increasing the degree of pressure. As before stated, the double apparatus may be so adjusted by the manipulation of its valves as to cut out one vessel entirely from the process.

The vulcanizing process may be effected without the application of pressure, but with ventilation, and it is possible also to obtain a preparatory heating or vulcanizing under pressure.

By means of this process and apparatus a very porous article can be obtained in the vulcanizing vessel having the low pressure, said product being of a spongy nature, if desired, while in the other vessel subject to the high pressure the product obtained will be compact, firm, and hard.

We are aware of the process of vulcanization in which steam is admitted directly into the vulcanizing vessels for heating the same and securing the pressure; but in this the heat and pressure bear a constant relation to each other, and one cannot be varied independently of the other. If the pressure is increased, the heat must also be increased, with the liability of burning the articles, or if the pressure is reduced the heat must also be reduced, resulting in imperfect vulcanization.

We are aware also that it is old to vulcanize by means of hot air which is heated either outside of the vessel or inside of the same. In this process it is possible to produce any desirable temperature; but no pressure can be obtained.

The present method, as before pointed out, is distinguished in that any degree of heat and pressure may be obtained, and these may be varied independently of each other.

From the described construction of the apparatus it is clear that either one vessel alone under pressure or vacuum or both vessels at the same time may be used. In the latter case one of the vessels has any desired pressure and the other any desired vacuum, one vessel being according to the wishes of the operator fully or partly independent, or, if desired, dependent from the other vessel. The results of all these variations are fully new products, which hitherto could not be obtained. It is known by using a considerable pressure at the vulcanizing temperature that the goods are very strong without any pores. These products may also be obtained with the apparatus, as it is clear from the above statement. Further, when a vacuum is produced in one of the vessels then at the necessary temperature goods are produced which have a great number of considerably large pores, so that sponges of rubber may be produced, for instance. The production of these pores may be facilitated by adding such materials to the article to be vulcanized which evaporate at the vulcanizing temperature—as, for instance, carbonate of ammonia or turpentine, &c. This is quite new. If, further, first, the goods to be vulcanized are under vacuum of any desired degree at any temperature, so that porous goods are produced, and suddenly by alteration of the flow of air of the air-pump a pressure on these goods is produced, so the surface of the goods becomes hard, tight, and strong, as if the goods were from the first moment under pressure. By this process goods are therefore produced which in the inner are porous and at the surface hard and tight. It is clear that for a certain article not so much material is necessary, as according to the known process the price of the article can therefore be considerably lower, as hitherto. This proceeding is especially of great value if goods are to be vulcanized for which a great strength is not necessary. It is therefore possible to produce with the described apparatus the following kinds of goods: first, articles under pressure at any temperature to prevent pores in the goods; second, articles under vacuum at any temperature to produce goods of more or less porosity; third, articles first under vacuum and then under pressure at any temperature to produce goods which in the inner are more or less porous and at the surface strong, tight, and even. By combining two vessels, as done in the drawing, the one vessel may be under vacuum to produce porous goods and the other under pressure to prevent pores.

We claim—

1. In combination, two vulcanizing vessels, a pump having its pressure side connected with one vessel and its suction side connected with the other vessel, means for heating the vessels and a pipe connecting the vessels whereby a circulation may be effected through them, substantially as described.

2. In combination, the two vessels, an air-pump having its suction side connected with one vessel and its pressure side connected with the other vessel, a pipe connecting the vessels and ventilating-valves, substantially as described.

3. In combination the two vessels, an air-pump having its pressure side connected with one vessel and its suction side connected with the other vessel, a pipe connecting the vessels, ventilating-valves and cut-off valves, substantially as described.

In witness whereof we have hereunto set our hands in presence of two witnesses.

BENJAMIN WLADIMIR WITTENBERG.
  ERWIN BROCK.
  ERWIN KOCH.

Witnesses:
 VILH. EICHMANN,
 K. A. PERSSON.